US008543086B2

(12) United States Patent
Fortunatow

(10) Patent No.: US 8,543,086 B2
(45) Date of Patent: Sep. 24, 2013

(54) SYSTEM FOR SCHOOLS MANAGING SMS CREDITS USING MOBILE REVERSE CHARGE TECHNOLOGY

(75) Inventor: Mark Fortunatow, Rose Park (AU)

(73) Assignee: MGM Wireless Holdings Pty Ltd, Rose Park, S.A. (AU)

( * ) Notice: Subject to any disclaimer, the term of this patent is extended or adjusted under 35 U.S.C. 154(b) by 0 days.

(21) Appl. No.: 13/502,738

(22) PCT Filed: Oct. 20, 2010

(86) PCT No.: PCT/AU2010/001390
§ 371 (c)(1),
(2), (4) Date: Jun. 5, 2012

(87) PCT Pub. No.: WO2011/047424
PCT Pub. Date: Apr. 28, 2011

(65) Prior Publication Data
US 2012/0231762 A1    Sep. 13, 2012

(30) Foreign Application Priority Data
Oct. 20, 2009  (AU) ................................ 2009905100

(51) Int. Cl.
H04L 12/14     (2006.01)
(52) U.S. Cl.
USPC ......... 455/406; 455/466; 455/414.1; 455/407
(58) Field of Classification Search
USPC ................................ 455/406, 466, 414.1, 407
See application file for complete search history.

(56) References Cited

U.S. PATENT DOCUMENTS

| | | | |
|---|---|---|---|
| 8,355,990 B2* | 1/2013 | Toutonghi ........................ 705/53 |
| 2005/0130112 A1* | 6/2005 | Lotvin et al. .................. 434/323 |
| 2006/0015399 A1 | 1/2006 | Alberth, Jr. et al. |
| 2006/0029194 A1 | 2/2006 | Hurd et al. |
| 2006/0172274 A1* | 8/2006 | Nolasco ........................ 434/350 |
| 2006/0190321 A1* | 8/2006 | Martins Nicho et al. ....... 705/14 |
| 2007/0042750 A1* | 2/2007 | O'Neil et al. .................. 455/405 |
| 2007/0162331 A1* | 7/2007 | Sullivan .......................... 705/14 |
| 2007/0203836 A1* | 8/2007 | Dodin ............................. 705/44 |
| 2008/0090550 A1* | 4/2008 | Scalisi et al. .................. 455/406 |
| 2008/0097805 A1* | 4/2008 | Wells ................................ 705/7 |

(Continued)

FOREIGN PATENT DOCUMENTS

| WO | 03/049371 A1 | 6/2003 |
|---|---|---|
| WO | WO 2005/055101 | * 12/2004 |

OTHER PUBLICATIONS

International Search Report dated Jan. 24, 2011 for PCT/AU2010/001390, 10 pages.

*Primary Examiner* — Kamran Afshar
*Assistant Examiner* — Mong-Thuy Tran
(74) *Attorney, Agent, or Firm* — ARC IP Law, PC; Joseph J. Mayo

(57) ABSTRACT

A method of billing or charging a receiver for a mobile communication being message, that allows the receiver to receive messages as part of a service, the receiver being billed directly by the telecommunications carrier who then in turn aggregates a revenue share based on messages sent to receivers, who then in turn pay a percentage of the revenue share to the premium SMS aggregator. The receiver can be of a selected status, which is set to a pre-selected schedule and can receive messages without charge or with a charge. This enables the payment system to be simple and efficient.

6 Claims, 1 Drawing Sheet

(56) References Cited

U.S. PATENT DOCUMENTS

| | | | |
|---|---|---|---|
| 2008/0299944 A1* | 12/2008 | Cai | 455/406 |
| 2009/0157523 A1* | 6/2009 | Jones et al. | 705/26 |
| 2009/0240586 A1* | 9/2009 | Ramer et al. | 705/14 |
| 2010/0070569 A1* | 3/2010 | Turakhia | 709/203 |
| 2010/0169179 A1* | 7/2010 | Ramer et al. | 705/14.54 |
| 2010/0191576 A1* | 7/2010 | Raleigh | 705/10 |
| 2010/0225471 A1* | 9/2010 | Kawamoto et al. | 340/539.13 |
| 2010/0250687 A1* | 9/2010 | Smith et al. | 709/206 |
| 2010/0306099 A1* | 12/2010 | Hirson et al. | 705/38 |
| 2011/0055859 A1* | 3/2011 | Dasher et al. | 725/1 |
| 2011/0078061 A1* | 3/2011 | Cai et al. | 705/30 |
| 2011/0231308 A1* | 9/2011 | Rodkey et al. | 705/39 |
| 2011/0237222 A1* | 9/2011 | Niejadlik | 455/411 |
| 2011/0286584 A1* | 11/2011 | Angel et al. | 379/88.02 |
| 2012/0064860 A1* | 3/2012 | O'Neil et al. | 455/408 |
| 2012/0082974 A1* | 4/2012 | Shustorovich et al. | 434/429 |
| 2012/0184244 A1* | 7/2012 | Cai et al. | 455/408 |

* cited by examiner

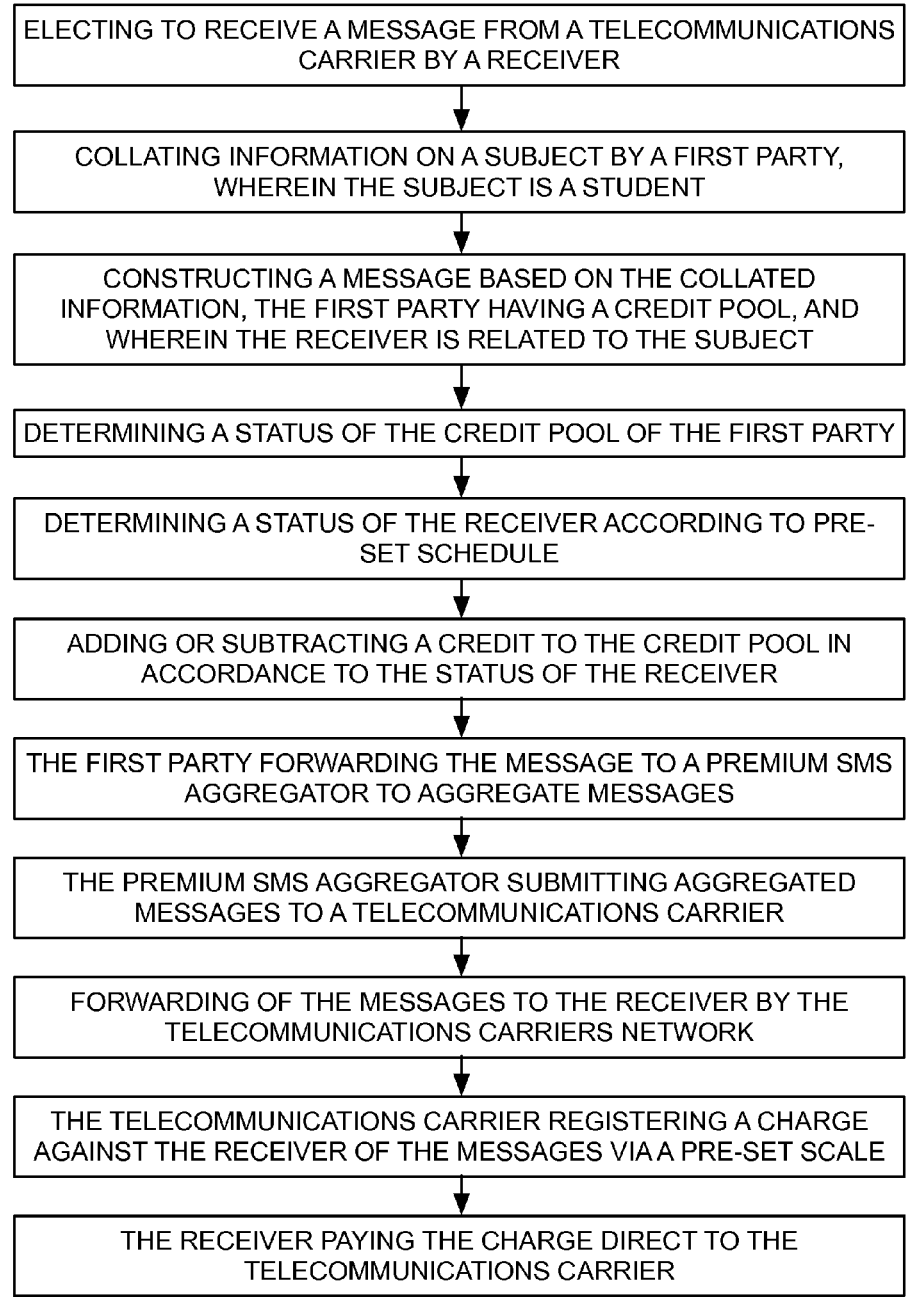

SYSTEM FOR SCHOOLS MANAGING SMS CREDITS USING MOBILE REVERSE CHARGE TECHNOLOGY

CROSS-REFERENCE TO RELATED APPLICATIONS

This application is a National Stage entry of International Application No. PCT/AU2010/001390, filed 20 Oct. 2010, which claims priority to Australian Patent Application AU 2009905100, filed 20 Oct. 2009, the specifications of which are both hereby incorporated herein by reference.

FIELD OF THE INVENTION

The present invention relates to a method of telecommunications billing and in particular to a method of billing a calling party without charging an information provider.

DESCRIPTION OF THE PRIOR ART

Mobile communication companies supply many services to end users or customer. Some of these services are provided by the short message service (SMS) or multimedia message services (MMS), both of which are recognised industry standard communication protocols.

SMS in particular has shown to be a useful method of communicating small messages to users, at their request, in a relatively easy manner. SMS has grown in acceptance amongst the majority of mobile telecommunications users, whereby many users use SMS on a regular basis to obtain information on various subjects. This is often referred to as "premium charged content" as opposes to simple "peer-to-peer" content.

An example of "premium charged content" is where a user subscribes, or "opts in" to a news service provided by a telecommunications service provider; these are commonly referred to as "alerts". For example, the BBC provide a BBC news SMS alerts service where a user sends a SMS to a number designated by the telecommunications network to subscribe then the BBC, via the telecommunications service provider send news alerts to the subscriber at a preset fee, typically $0.20-$0.30 per message, which is paid direct to the telecommunications service provider. In this instance, the news service provider, the BBC, is a third-party value added service provider (VASP) or content provider.

The telecommunications service provider also charge the BBC, or other information service provider, for providing a conduit for the transmission of the SMS alerts to the end user.

However, this method of charging both the information service provider (VASP) and the end user does not facilitate the provision of information that has a low frequency of sent messages or acts as a barrier to market for the provision of information that may be of a very specific nature where each message sent may be of value and relevancy to a specific intended receiver and not to a general audience.

Such information may be information relating to the attendance or non-attendance of an individual at a school or institution. Such information on attendance or non-attendance is of a very specific nature and not intended for a general audience, such as a SMS on news headlines, for example.

The costs incurred by the school or institution in firstly setting up an attendance information system that enable the school or institution to provide such attendance information to intended users can be considered to be a barrier to providing such a service. Additionally, without the attendance information from the school or institution then a VASP is discouraged from providing some information services due to the high costs of setting up the service.

OBJECT OF THE INVENTION

It is an object of the present invention to provide a method of billing a mobile subscriber for information services without charging the information provider.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is provided a method of billing or charging a receiver for a mobile communication being message, the method including the steps of:

a receiver electing to receive a message from a telecommunications carrier;

an at least one first party collating information on a subject and constructing a message based on the collated information, the first party having a credit pool;

determining a status of the credit pool of the first party;

determining the status of the receiver according to pre-set schedule;

adding or subtracting a credit to the credit pool in accordance to the status of the receiver the first party forwarding the message to a premium SMS aggregator to aggregate messages;

the premium SMS aggregator submitting aggregated messages to a telecommunications carrier;

forwarding of the messages to the receiver by the telecommunications carriers network;

the telecommunications carrier registering a charge against the receiver of the messages in relation to a pre-set scale;

the receiver paying the charge direct to the telecommunications carrier;

the telecommunications carrier aggregates a revenue share based on messages sent to receivers; and paying a percentage of the revenue share to the premium SMS aggregator.

In preference, the collated information is attendance data.

In preference, the receiver elects to receive a message from a telecommunications carrier by pre-registering with the information provider.

In preference, message is an SMS.

In preference, the information provider compiles the collated information into a SMS message prior to forwarding to premium SMS aggregator.

In preference, the pre-set schedule is a database containing receivers details the receivers details including a charge discount, said discount being applied to registered charge.

In preference the receiver's details include a charging status.

BRIEF DESCRIPTION OF THE DRAWINGS

FIG. 1 illustrates an embodiment of the invention as claimed herein.

DETAILED DESCRIPTION OF THE INVENTION

A school, or other institution in which attendance data is recorded, collects information relating to attendance of students or other personnel and enters this information into a student information system. The student information system is provided to the school by a service provider such as [MGM] and the school then collates the attendance data and constructs an attendance message containing attendance information in a form that matches individual attendance of a person with an intended recipient.

The intended recipient is a person who has requested or has opt-in to receive messages on the attendance or non-attendance of a particular individual from the school or institutions and provides a mobile telephone number on which they would like to receive attendance information. For example, the recipient may be a parent of a child at school, where the parent has a desire to be made aware of the attendance or non-attendance of the child at the school.

In addition to the attendance information, the information may be in relation to specific events deemed by the school or institution as being appropriate to send to the intended recipient and may include information such as sporting events, event location changes, security information, health information etc.

Once the attendance message has been compiled at the school via the student information system, this compiled attendance message, containing all the attendance information, is processed into a message suitable for sending via SMS and is forwarded to a processing centre to check for data accuracy and integrity and then subsequently sent to a SMS aggregator.

The SMS aggregator then forwards the specific attendance messages to a telecommunications carrier in the form of a SMS, the telecommunications carrier in turn forwards the SMS to the intended recipient's numbers as requested in the specific attendance message.

The details of the intended receiver also includes details regarding the receivers status, in particular their status in regards to charging (charging status). Some intended receivers will be registered as being able to receive all messages at no cost, if their economic status, as determined by the institution or a particular government body for example, has indicated that they are not capable of paying for such a service.

Other intended recipients may be determined as being capable for paying for all services/messages and are therefore allocated a separate status. All messages then sent to such intended recipients will incur full pro-rata costs.

For example, the parent of a child at school may be allocated as to belong to one of four categories:

Approved patent/caregiver;
Casual parent/caregiver;
School Nominated parent-caregiver; or
Non-financial parent/caregiver.

In order for a school to send messages using the system it must be in credit in a credit pool (SMS credit). Each time a message is sent to an intended receiver the system, such as the SMS aggregator determines the status of the schools credit pool and upon confirming that sufficient SMS credits exist then credits or debits the SMS pool based on the "parent type" in accordance with, for example, the following table:

| Parent Type | Fee on mobile phone account | Attendance Messaging | | Other Messaging Crisis/ Parent Reminder/etc | |
|---|---|---|---|---|---|
| | | Cost to Parent | Effect on credit pool | Cost to Parent | Effect on credit pool | Effect on Credit Pool |
| Approved | $5 Monthly Subscription | Free | 0 | Free | 0 | +2 per month |
| Casual | $2 to receive each Attendance SMS | $2 to receive each Attendance SMS | +1 | Free | −1 | |
| School Nominated | Free | Free | −1 | Free | −1 | |
| Non-Financial | Nil | Free | −1 | Free | −1 | |

By having such a status linked to the intended recipients details its now possible to create various status levels in-between full charge and no-charge status's so as to accommodate various other levels of economic status as reflected by the needs of the system and the requirements of the particular institution.

Once the intended receiver has been sent the message the system then levies a charge against the intended recipient in accordance with their charging status.

The intended recipient then receives the specific attendance message from the telecommunications carrier and subsequently receive a bill for the message in their phone bill. Upon payment of the bill from the telecommunications carrier, the telecommunications carrier then collates the SMS aggregators revenue share, based on a percentage of charge or at a fixed rate or some other formula and then forwards the SMS aggregators revenue share to the SMS aggregator.

Alternatively, but still within the scope of the invention, the intended recipient may pay a fixed monthly charge (or other time period subscription that, for example, may coincide with the enrollment of the child at school) in relation to receiving such messages, entitling the intended recipient to receive as many messages at no additional per message charge.

Upon receipt of the SMS aggregators revenue share by the SMS aggregator, the SMS aggregator then forwards a revenue share to the service provider [MGM] based on a percentage of charge or at a fixed rate or some other formula.

In this way, as now is apparent, the school does not incur a cost in relation the sending of the attendance information to the intended recipient rather it is the intended recipient that, by opting in to receive attendance information of a particular individual agrees to be invoiced charges for receipt of that information. This differs markedly from the way in which present VASP's operate in that there is first of all a charge associated with the collection of information and subsequent charges for the distribution of the information.

Although the invention has been herein shown and described in what is conceived to be the most practical and preferred embodiment, it is recognized that departures can be made within the scope of the invention, which is not to be limited to the details described herein.

The invention claimed is:

1. A method of billing or charging a receiver for a mobile communication being a message, the method including the steps of:
   - a receiver electing to receive a message from a telecommunications carrier;
   - an at least one first party collating information on a subject, wherein the subject is a student, and constructing a message based on the collated information, the first party having a credit pool, and wherein the receiver is related to the subject;
   - determining a status of the credit pool of the first party;
   - determining a status of the receiver according to pre-set schedule;
   - adding or subtracting a credit to the credit pool in accordance to the status of the receiver
   - the first party forwarding the message to a premium Short Message Service (SMS) aggregator to aggregate messages;
   - the premium SMS aggregator submitting aggregated messages to a telecommunications carrier;
   - forwarding of the messages to the receiver by the telecommunications carriers network;
   - the telecommunications carrier registering a charge against the receiver of the messages in relation to a pre-set scale;
   - the receiver paying the charge direct to the telecommunications carrier;
   - the telecommunications carrier aggregates a revenue share based on messages sent to receivers; and
   - paying a percentage of the revenue share to the premium SMS aggregator.

2. The method of claim 1, wherein the collated information is attendance data.

3. The method of claim 2, wherein the receiver elects to receive a message from a telecommunications carrier by pre-registering with an information provider.

4. The method of claim 3, wherein the information provider compiles the collated information into a SMS message prior to forwarding to premium SMS aggregator.

5. The method of claim 4, wherein the pre-set schedule is a database containing receivers details the receivers details including a charge discount, said discount being applied to registered charge.

6. The method of claim 5, wherein the receiver's details include a charging status.

\* \* \* \* \*